US009137628B2

(12) United States Patent
Gao et al.

(10) Patent No.: US 9,137,628 B2
(45) Date of Patent: Sep. 15, 2015

(54) SYSTEMS AND METHODS FOR ESTABLISHING A WIRELESS DISPLAY CONNECTION

(71) Applicants: Jie Gao, Sunnyvale, CA (US); Xintian E. Lin, Mountain View, CA (US); Kwan Ho Lee, Mountain View, CA (US); Ulun Karacaoglu, San Diego, CA (US)

(72) Inventors: Jie Gao, Sunnyvale, CA (US); Xintian E. Lin, Mountain View, CA (US); Kwan Ho Lee, Mountain View, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 14/105,547

(22) Filed: Dec. 13, 2013

(65) Prior Publication Data

US 2015/0172848 A1     Jun. 18, 2015

(51) Int. Cl.
| | |
|---|---|
| *H04B 5/00* | (2006.01) |
| *H04W 4/00* | (2009.01) |
| *H04W 24/08* | (2009.01) |
| *H04W 52/02* | (2009.01) |
| *G06F 3/14* | (2006.01) |

(52) U.S. Cl.
CPC ............ *H04W 4/008* (2013.01); *G06F 3/1454* (2013.01); *H04W 24/08* (2013.01); *H04W 52/0229* (2013.01)

(58) Field of Classification Search
USPC ......... 455/41.1–41.3, 456.1, 456.5, 457, 566, 455/575.1; 709/206, 217, 219; 340/932.1, 340/932.2
See application file for complete search history.

(56) References Cited

U.S. PATENT DOCUMENTS

| | | | | |
|---|---|---|---|---|
| 2006/0227010 | A1* | 10/2006 | Berstis et al. | 340/932.2 |
| 2006/0246921 | A1* | 11/2006 | Russ | 455/456.5 |
| 2011/0191432 | A1* | 8/2011 | Layson, Jr. | 709/206 |
| 2012/0322367 | A1* | 12/2012 | Kee | 455/41.1 |
| 2013/0324035 | A1* | 12/2013 | Strommen | 455/41.1 |
| 2015/0112838 | A1* | 4/2015 | Li et al. | 705/26.61 |

* cited by examiner

*Primary Examiner* — Thanh Le
(74) *Attorney, Agent, or Firm* — Sutherland Asbill & Brennan LLP

(57) ABSTRACT

The present disclosure relates to computer-implemented systems and methods for establishing a wireless display connection. A user device may detect, by an RFID tag, a signal from a wireless display device. As a result, the user device may transmit, by the RFID tag to the wireless display device, radio communication information. To this end, the user device and the wireless display device may establish a radio connection. Using the radio connection, the user device may receive wireless display connection information from the wireless display device. The user device may establish, using wireless display connection information, a streaming wireless display connection with the wireless display device.

30 Claims, 4 Drawing Sheets

SYSTEMS AND METHODS FOR ESTABLISHING A WIRELESS DISPLAY CONNECTION

TECHNICAL FIELD

The present disclosure generally relates to wireless communication, and in particular, to establishing a wireless display connection.

BACKGROUND

The ability to wirelessly stream display information from a computer to a separate display device has been a recently growing trend. Establishing a wireless display connection between the computer and the display device, may typically involve a relatively high degree of use interaction. For example, a user may manually power on both the computer and the display device. After waiting for the devices to power on, the user may manually enter various communication credentials associated with the computer and/or the display device before the wireless display connection may be established.

BRIEF DESCRIPTION OF THE DRAWINGS

Reference will now be made to the accompanying figures and diagrams, which are not necessarily drawn to scale, and wherein.

DETAILED DESCRIPTION

Figure 1:
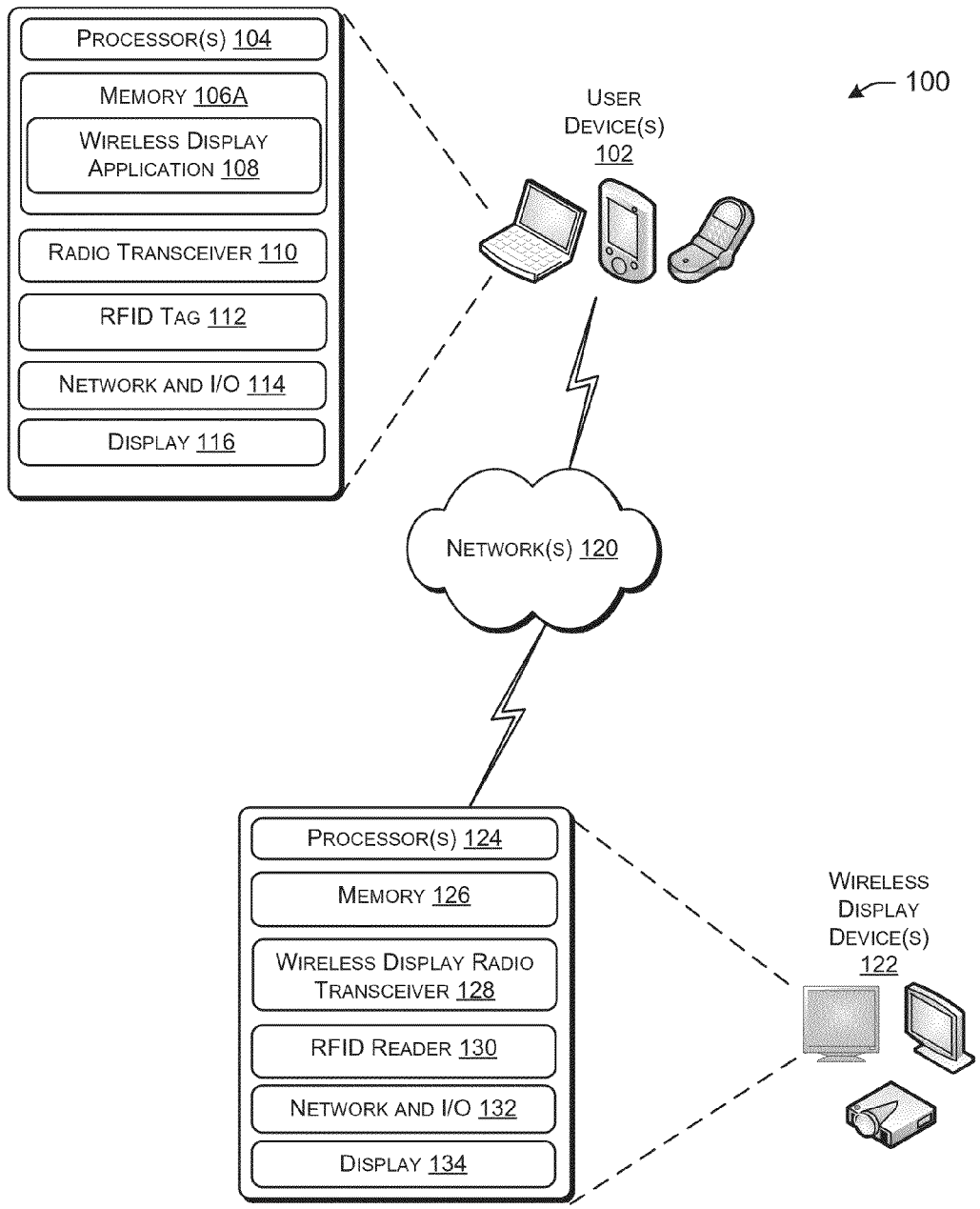
FIG. 1 shows a block diagram of a system for establishing a wireless display connection, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter.

According to certain embodiments, the functionality provided by the receiver and the transmitter may be included in a single transceiver device.

The present disclosure relates to computer-implemented systems and methods for establishing a wireless display connection. According to one or more embodiments of the disclosure, a device is provided. The device may include a radio transceiver and a radio frequency identification (RFID) tag. The device may also include at least one memory for storing data and computer-executable instructions. Additionally, the device may also include at least one processor to access the at least one memory and to execute the computer-executable instructions. Furthermore, the at least one processor may be configured to execute the instructions to detect, by the RFID tag, a signal from a wireless display device and initiate, in response to the signal, a transition of the user device from a first power state to a second power state. Additionally, the at least one processor may be configured to execute the instructions to transmit, by the RFID tag to the wireless display device, radio communication information and establish, by the radio transceiver based at least in part on the radio communication information, a radio connection with the wireless display device. The at least one processor may also be configured to execute the instructions to receive, by the radio transceiver from the wireless display device, wireless display connection information associated with the wireless display device. The at least one processor may also be configured to execute the instructions to establish, based at least in part on the wireless connection information, a streaming wireless display connection with the wireless display device.

According to one or more embodiments of the disclosure, a method is provided. The method may include detecting, by a computer, a signal from a wireless display device. The computer may include one or more processors, a radio transceiver, and an RFID tag. The method may also include switching, by the computer in response to the signal, from a first power state to a second power state and transmitting, by the RFID tag to the wireless display device, radio communication information. Additionally, the method may include establishing, by the radio transceiver based at least in part on the radio communication information, a radio connection with the wireless display device. The method may also include receiving, by the radio transceiver from the wireless display device, wireless display connection information associated with the wireless display device. Further still, the method may include establishing, based at least in part on the wireless display connection information, a streaming wireless display connection with the wireless display device.

According to one or more embodiments of the disclosure, a device is provided. The device may include a radio transceiver and a radio frequency identification (RFID) reader. The device may also include at least one memory for storing data and computer-executable instructions. Additionally, the device may also include at least one processor to access the at least one memory and to execute the computer-executable instructions. Furthermore, the at least one processor may be configured to receive a user indication to switch the display device to a powered state and emit, by the RFID reader in response to the user indication, one or more broadcast signals. Additionally, the at least one processor may be configured to execute the instructions to receive, by the RFID reader in response to the one or more broadcast signals, radio communication information associated with a user device and establish, by the radio transceiver based at least in part on the radio communication information, a radio connection with the user device. The at least one processor may also be configured to execute the instructions to transmit, by the radio transceiver using the radio connection, wireless display connection information to the user device. The at least one processor may also be configured to execute the instructions to establish, based at least in part on the wireless display connection information, a streaming wireless display connection with the user device.

According to one or more embodiments of the disclosure, a non-transitory computer-readable medium is provided. The non-transitory computer-readable medium may have embodied thereon instructions executable by one or more processors. The instructions may cause the one or more processors to detect, by an RFID tag, a signal from a wireless display device and initiate, in response to the signal, a transition from a first power state to a second power state. Additionally, the computer-readable medium may include instructions to transmit, by the RFID tag to the wireless display device, radio communication information and establish, by the radio transceiver based at least in part on the radio communication information, a radio connection with the wireless display device. Moreover, the computer-readable medium may include instructions to receive, by the radio transceiver from the wireless display device, wireless display connection information associated with the wireless display device. Further still, the computer-readable medium may include instructions to establish, based at least in part on the wireless connection information, a streaming wireless display connection with the wireless display device.

The above principles, as well as perhaps others, are now illustrated with reference to FIG. 1, which depicts a system 100 for establishing a wireless display connection. The system 100 may include a user device 102 having one or more computer processors 104, a memory 106, which may store a wireless display application 108, a radio transceiver 110, a radio-frequency identification (RFID) tag 112, network and input/output (I/O) interfaces 114, and a display 116 in communication with each other. The system 100 may also include a network 120 to facilitate communication between the user device 102 and one or more wireless display devices 122. The wireless display device 122 may include one or more computer processors 124, a memory 126, a wireless display radio transceiver 128, an RFID reader 130, a network and input/output (I/O) interfaces 132, and a display 134 in communication with each other. It will be appreciated that all radio transceivers described with respect to the user device 102 and wireless display device(s) 122 may be configured to receive and/or transmit any type of radio signals (e.g., WiFi radio signals, Bluetooth radio signals, Bluetooth Low-Energy radio signals, etc.).

The computer processors 104/124 may comprise one or more cores and may be configured to access and execute (at least in part) computer-readable instructions stored in the memory 106/126. The one or more computer processors 104/124 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 102 may also include a chipset (not shown) for controlling communications between the one or more processors 104/124 and one or more of the other components of the user device 102. In certain embodiments, the user device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106/126 may comprise one or more computer-readable storage media (CRSM). In some embodiments, the memory 106/126 may include non-transitory media such as random access memory (RAM), flash RAM, magnetic media, optical media, solid-state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106/126 may store an operating system that includes a plurality of computer-executable instructions that may be implemented by the computer processor 104/124 to perform a variety of tasks to operate the interface(s) and any other hardware installed on the user device 102. The memory 106/126 may also store content that may be displayed by the user device 102 or transferred to other devices (e.g., headphones) to be displayed or played by the other devices. The memory 106/126 may also store content received from the other devices. The content from the other devices may be displayed, played, or used by the user device 102 to perform any necessary tasks or operations that may be implemented by the computer processor 104/124 or other components in the user device 102/122.

The network and I/O interfaces 114/134 may also comprise one or more communication interfaces or network interface devices to provide for the transfer of data between the user device 102 and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The user device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2012, published Mar. 29, 2012), the Bluetooth standard, or any other wireless standard and/or a combination thereof. The wireless system (not shown) may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 102 and another device such as an access point, a host computer, a server, a router, a reader device, and the like. The network 120 may include, but is not limited to: the Internet, a private network, a virtual private network, a wireless wide area network, a local area network, a metropolitan area network, a telephone network, and so forth.

The display 116/134 may include, but is not limited to, a liquid crystal display, a light-emitting diode display, or an E-Ink™ display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

Broadly, a user of the user device 102 may wish to establish a streaming wireless display connection with a wireless display device 122. According to certain embodiments, a streaming wireless display connection may be established between the user device 102 and the wireless display device 122 during a power-on sequence of the wireless display device 122 (e.g., while the wireless display device 122 switches from a no-power and/or low-power state to a full power state). Additionally, the streaming wireless display connection may include, but is not limited to, a Wi-Fi Direct connection, a Miracast connection, and/or other types of wireless display connections. Furthermore, the streaming wireless display connection may be established with relatively few instances of user interaction with the user device 102 and/or the wireless display device 122.

For example, in order to establish the streaming wireless display connection, a user may provide an indication and/or initiate a power-on sequence by the wireless display device. For instance, the wireless display device 122 may include any type of mechanism, such as a button, switch, and/or the like, that the user can interact with to initiate the power-on sequence. As used herein, a power-on sequence may include a process by which the wireless display device 122 switches from a lower power state to a higher power state (e.g., from an off-state to an on-state).

In response to the initiation of the power-on sequence, the RFID reader 130 on the wireless display device 122 may be configured to transmit a broadcast signal. In some embodiments, the RFID reader 130 may transmit the broadcast signal in the form of a magnetic field. To this end, the RFID tag 112 in the user device 102 may be configured to receive and/or detect the broadcast signal. In instances where the broadcast signal includes a magnetic field, the RFID tag 112 may be energized by the magnetic field (e.g., thereby detecting the broadcast signal of the RFID reader 130) if it is located within a certain proximity (e.g., approximately 1.5 meters) to the magnetic field.

According to one or more embodiments, upon detecting the broadcast signal (e.g., being energized by the magnetic field), the RFID tag 112 may be configured initiate a "wake-up" sequence for the user device 102. For instance, the RFID tag 112 may transmit instructions to the user device 102 (e.g., to the wireless display application 108) that cause the user device 102 to transition from a first power state (e.g., a sleep state) to a second power state (e.g., a full-power state). As another example, the user device 102 may be a mobile device in sleep mode with its display 116 in an OFF state. If the mobile device is placed within range of a magnetic field emitted by the RFID reader 130, the RFID tag 112 may be configured to initiate a "wake-up" sequence. As a result, the mobile device may transition to a fully powered state, which may also cause its display to be switched to an ON state.

Furthermore, RFID tag 112 may be configured to perform additional operations upon detecting the broadcast signal of the wireless display device 122 (e.g., the RFID reader 130). For example, the RFID tag 112 may transmit radio communication information to the RFID reader 130 of the display device 122. The radio communication information may include any type of data that facilitates the establishment of a radio connection between the user device 102 and the wireless display device 122. For example, the radio communication information may include a network address identifier (e.g., a media access control (MAC) address), a pairing key, and/or the like associated with the radio transceiver 110 of the user device 102. In certain implementations, the radio communication information may be stored on the user device 102, such as in memory 106. Alternatively, the radio communication information may be stored in any storage location, both local and/or remote to the user device 102. Upon receiving the radio communication information from the RFID tag 112, the RFID reader 130 may provide the radio communication information to the wireless display radio transceiver 128 of the wireless display device 122.

According to certain embodiments, wireless display radio transceiver 128 may establish, based at least in part on the received radio communication information, a radio connection with the radio transceiver 110 of the user device 102. For instance, as discussed above, the radio communication information may include a MAC address and/or pairing key associated with the radio transceiver 110. To this end, the wireless display radio transceiver 128 may pair and/or otherwise connect with the radio transceiver 110 of the user device 102 using the MAC address and/or pairing key.

Upon establishing a radio connection between the wireless display radio transceiver 128 and the radio transceiver 110, the user device 102 (e.g., via the wireless display application 108) may prompt and/or otherwise provide an indication (e.g., via display 116) to the user to confirm an intention to establish a streaming wireless display connection with the wireless display device 122. For example, the indication may include a message to instruct the user to enter a certain key combination, touch gesture, and/or any other type of input to confirm an intention to establish a streaming wireless display connection. Upon receiving confirmation input from the user, such as by the wireless display application 108, the wireless display application 108 may direct the radio transceiver 110 to transmit a request, to the wireless display radio transceiver 128, for wireless display connection information.

In response to the request, the wireless display radio transceiver 128 may be configured to transmit wireless display connection information to the radio transceiver 110. The wireless display connection information may include any type data that may facilitate a streaming wireless display connection between the user device 102 and the wireless display device 122. For instance, the wireless display connection information may include a wireless display identifier and/or a personal identification number (PIN) associated with the wireless display device 122. Upon receipt of the wireless display connection by the radio transceiver 110, a streaming wireless display connection may be established between the user device 102 and the wireless display device 122. In certain embodiments, the streaming wireless display connection may be established between the radio transceiver 110 of the user device 102 and the wireless display radio transceiver 128. Alternatively, one or more other radio transceivers (not illustrated) included in either the user device 102 and/or the wireless display device 122 may be configured to establish the streaming wireless display connection using the wireless display connection information.

In other embodiments, the wireless display radio transceiver 128 may be configured to automatically transmit, upon establishing a radio connection with the radio transceiver 110, the wireless display connection information to the radio transceiver 110. As discussed above, a streaming wireless display connection may then be established, using the wireless display connection information, between the user device 102 and the wireless display device. Furthermore, the streaming wireless display connection may be established without user input and/or confirmation of an intention to establish the connection.

It will be appreciated that while the foregoing description has referenced the use of RFID technology (e.g., RFID tag 112 and RFID reader 130), any other type of proximity detection methods are also contemplated within the present disclosure. For example, other wireless protocols such as Wi-Fi, Bluetooth, Bluetooth-Low Energy, and/or the like may also be used.

Figure 2:
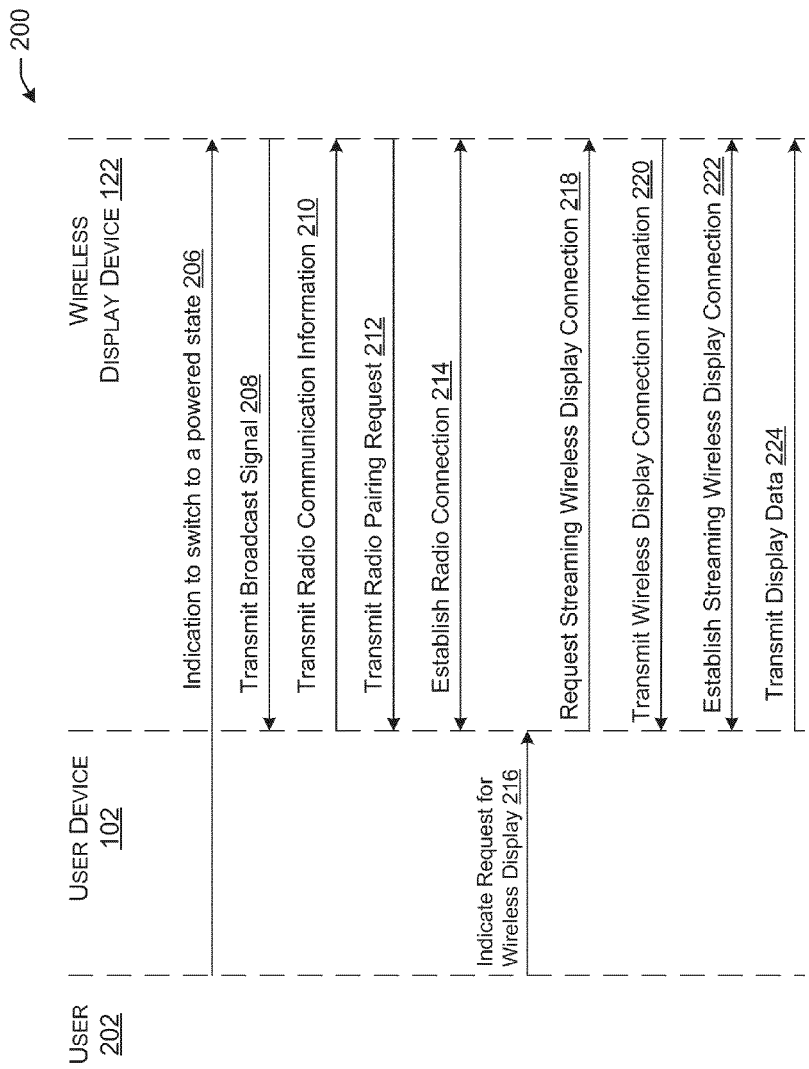
FIG. 2 shows a data flow diagram for establishing a wireless display connection, according to one or more example embodiments.

FIG. 2 provides a diagram illustrating a data flow 200 between a user, a user device 102, and a wireless display device 122 in accordance with one or more example embodiments. The data flow 200 may describe a process by which the user device 102 may establish a streaming wireless display connection with a wireless display device 122.

In accordance with one or more embodiments of the data flow 200, a user 202 may provide an indication 206 to the wireless display device 122 to switch the wireless display device 122 to a powered state. For example, the wireless display device may be a display projector in an OFF state. The user 202 may press a power button located on the display projector to switch the display projector from an OFF state to a powered or ON state. Upon switching to the powered state, the wireless display device 122 may be configured to transmit a broadcast signal 208. In certain embodiments, the transmission of the broadcast signal 208 may include emitting a magnetic field, such as by an RFID reader 130 included in the wireless display device 122.

In certain implementations, upon detecting the broadcast signal, the user device 102 may transition from a first power state to a second power state (e.g., from a sleep power state to a wake and/or fully powered state). For instance, the RFID tag 112 of the user device may become energized upon entering within a certain proximity of a magnetic field emitted by the RFID reader 130 (e.g., 1.5 meters) of the wireless display device 122. Upon being energized, the RFID tag 112 may be configured to transmit instructions to initiate a "wake-up" sequence by the user device 102. Such a sequence may cause the user device 102 to switch from the first power state to the second power state.

Furthermore, upon detecting and/or otherwise receiving the broadcast signal, the user device 102 may also be configured to transmit radio communication information 210 to the wireless display device 122. For example, the RFID tag 112 of the user device 112, upon entering within the certain proximity of the magnetic field of the RFID reader 130, may be configured to transmit the radio communication information 210 to the RFID reader 130. As previously discussed, the radio communication information may include a network address identifier, a pairing key, and/or any other identifying information associated with the radio transceiver 110.

The wireless display device 122 may receive the radio communication information and in response, may transmit a radio pairing request 212 back to the user device 102. As a result, a radio connection 214 may be established between the user device 012 and the wireless display device 122 (e.g., between the radio transceiver 110 and the wireless display radio transceiver 128) using the radio communication information. In certain embodiments, once the radio connection as been established, the user device 102 may wait for an input by the user 202 to indicate an intention to establish a streaming wireless display connection with the wireless display device. In some instances, if the user device 102 does not receive such an indication within a predetermined time limit (e.g., one minute), the user device 102 may switch back to a sleep state (e.g., the first state). Otherwise, the user device 102 may receive an indication and/or request 216 from the user to establish the streaming wireless display connection. For example, a user 202 may provide a particular input combination (e.g., via a keyboard, touch gesture, voice command, etc.) to the user device 102.

Upon receipt of the indication 216, the user device may request a streaming wireless display connection 218 with the wireless display device 204. For example, the radio transceiver 110 may transmit the request 218 to the wireless display radio transceiver 128. In response, the wireless display device 204 may transmit (e.g., via the wireless display transceiver 128) wireless display connection information 220 to the user device 102. As previously discussed, the wireless display connection information may include a wireless display identifier and/or a PIN associated with the wireless display device 122. To this end, the user device 102 may establish, based at least in part on the wireless display connection information, a streaming wireless display connection 222 with the wireless display device 122. As a result, the user device 102 may be configured to wirelessly transmit display data 224 to the wireless display device 122. In some implementations, the streaming wireless display connection 222 may be established between the radio transceiver 110 and the wireless display radio transceiver 128. Alternatively, the streaming wireless display connection may established with different radio transceivers.

It will be appreciated that the data flow 200 illustrated in FIG. 2 is not limited to any particular sequence and that communication between the user 202, user device 102, and the wireless display device 122, may be interleaved in any combination. Furthermore, it will be appreciated that in some implementations, communication between radio transceivers may be performed using short-wavelength radio signals (e.g., Bluetooth and/or Bluetooth Low-Energy). However, any other type of wireless signals are also contemplated and may be transmitted and/or received as broadcast signals, connection requests, and/or connection responses. In certain implementations, a streaming wireless display connection may be established automatically by the wireless display application 108 of the user device 102. In other implementations, such a connection may be established at a user's 202 selection and/or input.

Figure 3:
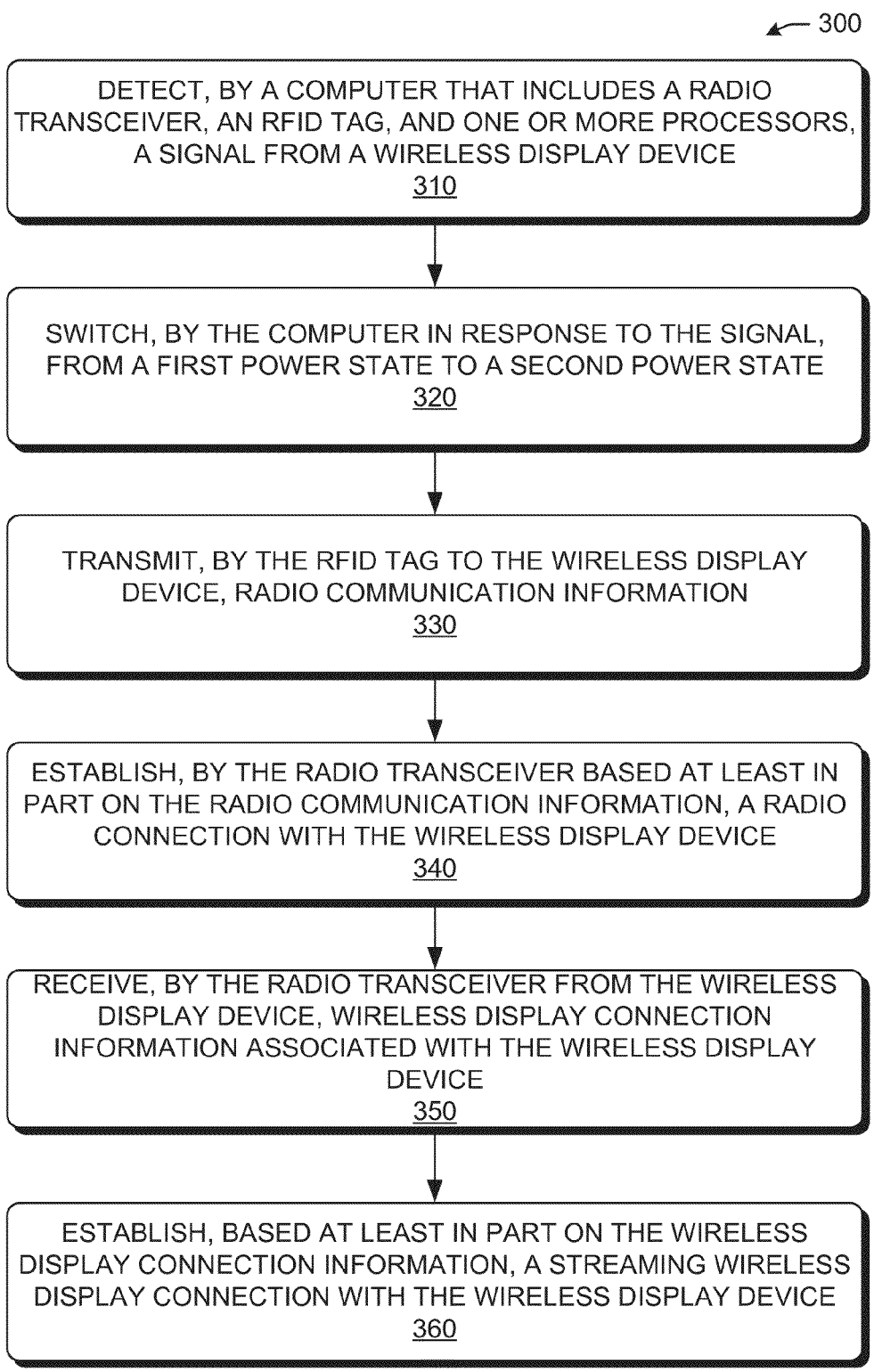
FIG. 3 show a flow diagram for establishing a wireless display connection, according to one or more example embodiments.

Referring now to FIG. 3, a flow diagram of a method 300 is illustrated for establishing a wireless display connection in accordance with one or more example embodiments. The method 300 may generally describe operations from the perspective of a user device. As such, the method 300 may begin in block 310, where a user device 102 may be configured to identify a signal from a wireless display device 122. The user device 102 may include one or more processors 104, a radio transceiver 110, and an RFID tag 110. In block 320, the user device 102 may switch, in response to the signal, from a first power state to a second power state (e.g., from a sleep state to a wake and/or full-power state). In block 330, the user device 102 may transmit, by the RFID tag 112 to the wireless display device 122, radio communication information. In certain implementations, the RFID tag 112 may be a passive device though in other implementations, the RFID tag 112 may be active as well. Furthermore, in certain cases such a request may be transmitted using short-wavelength radio signals, such as Bluetooth signals and/or Bluetooth Low-Energy signals.

In block 340, the user device 102 may be configured to establish, by the radio transceiver 110 based at least in part on the radio communication information, a radio connection with the wireless display device 122. In block 350, the user device 102 may receive, by the radio transceiver 110 from the wireless display device 122, wireless display connection information associated with the wireless display device 122. In block 360, the user device 102 may be configured to establish, based at least in part on the wireless display connection information, a streaming wireless display connection with the wireless display device 122.

Figure 4:
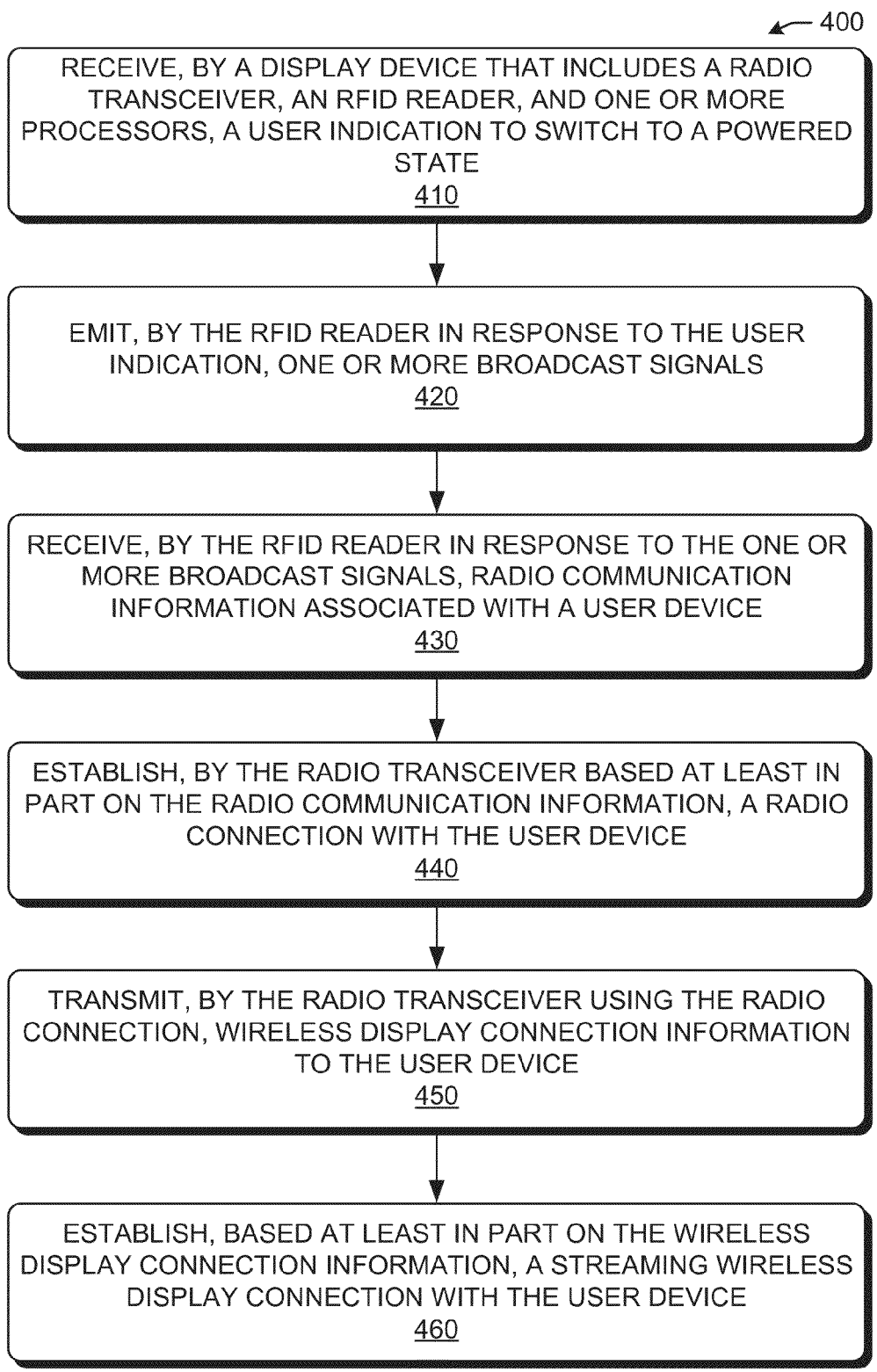
FIG. 4 shows a flow diagram for establishing a wireless display connection, according to one or more example embodiments.

Referring now to FIG. 4, a flow diagram of a method 400 is provided that depicts establishing a wireless display connection in accordance with one or more example embodiments. The method 400 may generally describe operations from the perspective a wireless display device (e.g., wireless display device 122). As such, the method 400 may begin in block 410, where a display device, such as a wireless display device 122, may receive a user indication to switch to a powered state. Additionally, the wireless display device 122 may include a radio transceiver 128, an RFID reader 130, and one or more processors. In block 420, the wireless display device 122 may be configured to emit, by the RFID reader 130, a one or more broadcast signals in response to the user indication to switch to a powered state.

In block 430, the wireless display device 122 may be configured to receive, by the RFID reader 130 in response to the one or more broadcast signals, radio communication information associated with a user device (e.g., user device 102). To this end, in block 440, the wireless display device 122 may be configured to establish, based at least in part on the radio communication information, a radio connection with the user device 102. In block 450, the wireless display device 122 may be configured to transmit, by the radio transceiver 128 using the radio connection, wireless display connection information to the user device 102. In block 460, the wireless display device 122 may establish, based at least in part on the wireless display connection information, a streaming wireless display connection with the user device 102.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a user device, comprising: a radio transceiver; a radio-frequency identification (RFID) tag; at least one processor; and at least one memory storing instructions, that when executed by the at least one processor, causes that at least one processor to: detect, by the RFID tag, a signal from a wireless display device; initiate, in response to the signal, a transition of the user device from a first power state to a second power state; transmit, by the RFID tag to the wireless display device, radio communication information; establish, by the radio transceiver based at least in part on the radio communication information, a radio connection with the wireless display device; receive, by the radio transceiver from the wireless display device, wireless display connection information associated with the wireless display device; and establish, based at least in part on the wireless connection information, a streaming wireless display connection with the wireless display device.

In Example 2, the subject matter of Example 1 can optionally include a second radio transceiver to establish the streaming wireless display connection with the wireless display device.

In Example 3, the subject matter of Example 1 can optionally include further instructions that cause the at least one processor to: transmit, using the streaming wireless display connection, display data to the wireless display device.

In Example 4, the subject matter of Example 1 can optionally include that the instructions to receive the wireless display connection information further comprises instructions to: receive, from a user, an indication to establish the streaming wireless display connection with the wireless display device; transmit, by the radio transceiver to the wireless display device, a request for the wireless display connection information; and receive the wireless display connection information in response to the request.

In Example 5, the subject matter of Example 4 can optionally include that the instructions to receive the indication from the user, further comprise instructions to: receive a combination of one or more keystrokes from the user to indicate an intention to establish the streaming wireless display connection.

In Example 6, the subject matter of Example 1 can optionally include that the instructions to detect the signal further comprise instructions to: detect a magnetic field associated with the wireless display device, wherein the RFID tag is energized by the magnetic field.

In Example 7, the subject matter of Example 1 can optionally include that the radio communication information comprises at least one of a network address identifier or a pairing key.

In Example 8, the subject matter of Example 1 can optionally include that wherein the wireless display connection information comprises at least one of a wireless display identifier or a personal identification number.

In Example 9, the subject matter of Example 1 can optionally include that the radio transceiver is a Bluetooth Low-Energy transceiver.

In Example 10, the subject matter of Example 1 can optionally include that the first power state is a sleep state, and the second power state is a full power state.

Example 11 is a method for wireless communication comprising: detecting, by a computer, a signal from a wireless display device, the computer comprising one or more processors, a radio transceiver, and a radio-frequency identification (RFID) tag; switching, by the computer in response to the signal, from a first power state to a second power state; transmitting, by the RFID tag to the wireless display device, radio communication information; establishing, by the radio transceiver based at least in part on the radio communication information, a radio connection with the wireless display device; receiving, by the radio transceiver from the wireless display device, wireless display connection information associated with the wireless display device; and establishing, based at least in part on the wireless display connection information, a streaming wireless display connection with the wireless display device.

In Example 12, the subject matter of Example 11 can optionally include that the computer further comprises a second radio transceiver to establish the streaming wireless display connection with the wireless display device.

In Example 13, the subject matter of Example 11 can optionally include transmitting, by the computer using the streaming wireless display connection, display data to the wireless display device.

In Example 14, the subject matter of Example 11 can optionally include that receiving the wireless display connection information further comprises: receiving, from a user, an indication to establish the streaming wireless display connection with the wireless display device; transmitting, by the radio transceiver to the wireless display device, a request for the wireless display connection information; and receiving the wireless display connection information in response to the request.

In Example 15, the subject matter of Example 11 can optionally include that the radio communication information comprises at least one of a network address identifier or a pairing key.

In Example 16, the subject matter of Example 11 can optionally include that the wireless display connection information comprises at least one of a wireless display identifier or a personal identification number.

Example 17 is a display device, comprising: a radio transceiver; a radio-frequency identification (RFID) reader; at least one processor; and at least one memory storing computer-executable instructions, that when executed by the at least one processor, causes the at least one processor to: receive a user indication to switch the display device to a powered state; emit, by the RFID reader in response to the user indication, one or more broadcast signals; receive, by the RFID reader in response to the one or more broadcast signals, radio communication information associated with a user device; establish, by the radio transceiver based at least in part on the radio communication information, a radio connection with the user device; transmit, by the radio transceiver using the radio connection, wireless display connection information to the user device; and establish, based at least in part on the wireless display connection information, a streaming wireless display connection with the user device.

In Example 18, the subject matter of Example 17 can optionally include that the at least one memory further comprises computer-executable instructions that cause the at least one processor to: receive, using the streaming wireless display connection, display data from the user device; and display one or more images associated with the display data.

In Example 19, the subject matter of Example 17 can optionally include that the at least one memory further comprises computer-executable instructions that cause the at least one processor to: switch the RFID reader to an unpowered state upon establishing the streaming wireless display connection with the user device.

In Example 20, the subject matter of Example 17 can optionally include that the streaming wireless display connection is established during a power-on sequence of the display device.

In Example 21, the subject matter of Example 17 can optionally include that the radio communication information comprises at least one of a network address identifier or a pairing key.

In Example 22, the subject matter of Example 17 can optionally include that the wireless display connection information comprises at least one of a wireless display identifier or a personal identification number.

Example 23, the subject matter of Example 17 can optionally include a second radio transceiver to establish the streaming wireless display connection with the wireless display device.

Example 24 is a non-transitory computer-readable medium comprising instructions, that when executed by at least one processor, cause the at least one processor to: detect, by an RFID tag, a signal from a wireless display device; initiate, in response to the signal, a transition from a first power state to a second power state; transmit, by the RFID tag to the wireless display device, radio communication information; establish, by the radio transceiver based at least in part on the radio communication information, a radio connection with the wireless display device; receive, by the radio transceiver from the wireless display device, wireless display connection information associated with the wireless display device; and establish, based at least in part on the wireless connection information, a streaming wireless display connection with the wireless display device.

In Example 25, the subject matter of Example 24 can optionally include that the computer-executable instructions further cause the at least one processor to: transmit, using the streaming wireless display connection, display data to the wireless display device.

In Example 26, the subject matter of Example 24 can optionally include that the computer-executable instructions further cause the at least one processor to: determine, for the respective inaudible audio signals, respective signal-to-noise information.

In Example 27, the subject matter of Example 24 can optionally include that the computer-executable instructions to receive the wireless display connection information further comprises instructions to: receive, from a user, an indication to establish the streaming wireless display connection with the wireless display device; transmit, by the radio transceiver to the wireless display device, a request for the wireless display connection information; and receive the wireless display connection information in response to the request.

In Example 28, the subject matter of Example 24 can optionally include that the computer-executable instructions to detect the signal further comprise instructions to: detect a magnetic field associated with the wireless display device, wherein the RFID tag is energized by the magnetic field.

In Example 29, the subject matter of Example 24 can optionally include that the radio communication information comprises at least one of a network address identifier or a pairing key.

In Example 30, the subject matter of Example 24 can optionally include that the wireless display connection information comprises at least one of a wireless display identifier or a personal identification number.

Example 31 is an apparatus, comprising: means for detecting, a magnetic field emitted from a wireless display device; means for switching, in response to the magnetic field, from a first power state to a second power state; means for transmitting, to the wireless display device in response to the magnetic field, radio communication information; means for establishing, based at least in part on the radio communication information, a radio connection with the wireless display device; means for receiving, from the wireless display device, wireless display connection information associated with the wireless display device; and means for establishing, based at least in part on the wireless display connection information, a streaming wireless display connection with the wireless display device.

In Example 32, the subject matter of Example 31 can optionally include means for transmitting, using the streaming wireless display connection, display data to the wireless display device.

In Example 33 the subject matter of Example 31 can optionally include that the means for receiving the wireless display connection information further comprises: means for receiving, from a user, an indication to establish the streaming wireless display connection with the wireless display device; means for transmitting, to the wireless display device, a request for the wireless display connection information; and means for receiving the wireless display connection information in response to the request.

In Example 34 the subject matter of Example 31 can optionally include that the means for receiving the indication from the user, further comprise: means for receiving a combination of one or more keystrokes from the user to indicate an intention to establish the streaming wireless display connection.

In Example 35 the subject matter of Example 31 can optionally include that the radio communication information comprises at least one of a network address identifier or a pairing key.

In Example 36 the subject matter of Example 31 can optionally include that the wireless display connection information comprises at least one of a wireless display identifier or a personal identification number.

In Example 37 the subject matter of Example 31 can optionally include that the radio transceiver is a Bluetooth Low-Energy transceiver.

In Example 38 the subject matter of Example 31 can optionally include that the first power state is a sleep state, and the second power state is a full power state.

What is claimed is:

1. A user device, comprising:
a radio transceiver;
a radio-frequency identification (RFID) tag;
at least one processor; and
at least one memory storing instructions, that when executed by the at least one processor, causes that at least one processor to:
detect, by the RFID tag, a signal from a wireless display device;
initiate, in response to the signal, a transition of the user device from a first power state to a second power state;
transmit, by the RFID tag to the wireless display device, radio communication information;
establish, by the radio transceiver based at least in part on the radio communication information, a radio connection with the wireless display device;
receive, by the radio transceiver from the wireless display device, wireless display connection information associated with the wireless display device; and
establish, based at least in part on the wireless connection information, a streaming wireless display connection with the wireless display device.

2. The user device of claim 1, further comprising a second radio transceiver to establish the streaming wireless display connection with the wireless display device.

3. The user device of claim 1, further comprising instructions that cause the at least one processor to:

transmit, using the streaming wireless display connection, display data to the wireless display device.

4. The user device of claim 1, wherein the instructions to receive the wireless display connection information further comprises instructions to:
receive, from a user, an indication to establish the streaming wireless display connection with the wireless display device;
transmit, by the radio transceiver to the wireless display device, a request for the wireless display connection information; and
receive the wireless display connection information in response to the request.

5. The user device of claim 4, wherein the instructions to receive the indication from the user, further comprise instructions to:
receive a combination of one or more keystrokes from the user to indicate an intention to establish the streaming wireless display connection.

6. The user device of claim 1, wherein the instructions to detect the signal further comprise instructions to:
detect a magnetic field associated with the wireless display device, wherein the RFID tag is energized by the magnetic field.

7. The user device of claim 1, wherein the radio communication information comprises at least one of a network address identifier or a pairing key.

8. The user device of claim 1, wherein the wireless display connection information comprises at least one of a wireless display identifier or a personal identification number.

9. The user device of claim 1, wherein the radio transceiver is a Bluetooth Low-Energy transceiver.

10. The user device of claim 1, wherein the first power state is a sleep state, and the second power state is a full power state.

11. A method, comprising:
detecting, by a computer, a signal from a wireless display device, the computer comprising one or more processors, a radio transceiver, and a radio-frequency identification (RFID) tag;
switching, by the computer in response to the signal, from a first power state to a second power state;
transmitting, by the RFID tag to the wireless display device, radio communication information;
establishing, by the radio transceiver based at least in part on the radio communication information, a radio connection with the wireless display device;
receiving, by the radio transceiver from the wireless display device, wireless display connection information associated with the wireless display device; and
establishing, based at least in part on the wireless display connection information, a streaming wireless display connection with the wireless display device.

12. The method of claim 11, wherein the computer further comprises a second radio transceiver to establish the streaming wireless display connection with the wireless display device.

13. The method of claim 11, further comprising transmitting, by the computer using the streaming wireless display connection, display data to the wireless display device.

14. The method of claim 11, wherein receiving the wireless display connection information further comprises:
receiving, from a user, an indication to establish the streaming wireless display connection with the wireless display device;
transmitting, by the radio transceiver to the wireless display device, a request for the wireless display connection information; and
receiving the wireless display connection information in response to the request.

15. The method of claim 11, wherein the radio communication information comprises at least one of a network address identifier or a pairing key.

16. The method of claim 11, wherein the wireless display connection information comprises at least one of a wireless display identifier or a personal identification number.

17. A display device, comprising:
a radio transceiver;
a radio-frequency identification (RFID) reader;
at least one processor; and
at least one memory storing computer-executable instructions, that when executed by the at least one processor, causes the at least one processor to:
receive a user indication to switch the display device to a powered state;
emit, by the RFID reader in response to the user indication, one or more broadcast signals;
receive, by the RFID reader in response to the one or more broadcast signals, radio communication information associated with a user device;
establish, by the radio transceiver based at least in part on the radio communication information, a radio connection with the user device;
transmit, by the radio transceiver using the radio connection, wireless display connection information to the user device; and
establish, based at least in part on the wireless display connection information, a streaming wireless display connection with the user device.

18. The display device of claim 17, wherein the at least one memory further comprises computer-executable instructions that cause the at least one processor to:
receive, using the streaming wireless display connection, display data from the user device; and
display one or more images associated with the display data.

19. The display device of claim 17, wherein the at least one memory further comprises computer-executable instructions that cause the at least one processor to:
switch the RFID reader to an unpowered state upon establishing the streaming wireless display connection with the user device.

20. The display device of claim 17, wherein the streaming wireless display connection is established during a power-on sequence of the display device.

21. The display device of claim 17, wherein the radio communication information comprises at least one of a network address identifier or a pairing key.

22. The display device of claim 17, wherein the wireless display connection information comprises at least one of a wireless display identifier or a personal identification number.

23. The display device of claim 17, further comprising a second radio transceiver to establish the streaming wireless display connection with the wireless display device.

24. A non-transitory computer-readable medium comprising instructions, that when executed by at least one processor, cause the at least one processor to:
detect, by an RFID tag, a signal from a wireless display device;
initiate, in response to the signal, a transition from a first power state to a second power state;
transmit, by the RFID tag to the wireless display device, radio communication information;

establish, by the radio transceiver based at least in part on the radio communication information, a radio connection with the wireless display device;

receive, by the radio transceiver from the wireless display device, wireless display connection information associated with the wireless display device; and establish, based at least in part on the wireless connection information, a streaming wireless display connection with the wireless display device.

25. The computer-readable medium of claim 24, wherein the computer-executable instructions further cause the at least one processor to:

transmit, using the streaming wireless display connection, display data to the wireless display device.

26. The computer-readable medium of claim 24, wherein the computer-executable instructions further cause the at least one processor to:

determine, for the respective inaudible audio signals, respective signal-to-noise information.

27. The computer-readable medium of claim 24, wherein the computer-executable instructions to receive the wireless display connection information further comprises instructions to:

receive, from a user, an indication to establish the streaming wireless display connection with the wireless display device;

transmit, by the radio transceiver to the wireless display device, a request for the wireless display connection information; and receive the wireless display connection information in response to the request.

28. The computer-readable medium of claim 24, wherein the computer-executable instructions to detect the signal further comprise instructions to:

detect a magnetic field associated with the wireless display device, wherein the RFID tag is energized by the magnetic field.

29. The computer-readable medium of claim 24, wherein the radio communication information comprises at least one of a network address identifier or a pairing key.

30. The computer-readable medium of claim 24, wherein the wireless display connection information comprises at least one of a wireless display identifier or a personal identification number.

* * * * *